United States Patent [19]

Brandt et al.

[11] 4,263,022
[45] Apr. 21, 1981

[54] ELECTROSTATIC PRECIPITATOR WITH RAPPERS FOR THE CORONA ELECTRODES

[75] Inventors: Joachim Brandt, Vahlberg; Werner Kantelhardt, Olpe, both of Fed. Rep. of Germany

[73] Assignee: Apparatebau Rothemühle Brandt & Kritzler, Wenden-Rothemühle, Fed. Rep. of Germany

[21] Appl. No.: 74,297

[22] Filed: Sep. 11, 1979

[30] Foreign Application Priority Data

Sep. 12, 1978 [DE] Fed. Rep. of Germany ....... 2839542

[51] Int. Cl.³ .............................................. B03C 3/76
[52] U.S. Cl. ...................................... 55/112; 64/9 R; 403/336; 403/338
[58] Field of Search ................... 55/13, 112, 146, 300; 64/13, 9 R; 403/335, 336, 338, 287

[56] References Cited

U.S. PATENT DOCUMENTS

| | | | |
|---|---|---|---|
| 1,940,777 | 12/1933 | Thompson | 64/1 R |
| 2,595,204 | 4/1952 | Richardson | 55/112 |
| 2,844,011 | 7/1958 | Meier | 64/1 R |
| 3,844,742 | 10/1974 | Peterson | 55/112 |
| 4,036,610 | 7/1977 | Huppi | 55/300 |

FOREIGN PATENT DOCUMENTS 406052  5/1971  U.S.S.R. .................................. 403/335

*Primary Examiner*—Bernard Nozick
*Attorney, Agent, or Firm*—Karl F. Ross

[57] ABSTRACT

An electrostatic filter having a plurality of adjacent precipitating or separating fields in a box-shaped housing, each field being defined between at least one collector electrode and at least one corona-discharge electrode. A rapper arrangement is provided in the housing and comprises respective whipping or tumbling hammers which strike against anvils on the holders of the collector and/or corona discharge electrodes. According to the invention, the aligned hammer shafts for the corona discharge electrodes of adjacent separating fields are interconnected by insulating couplings and have a common drive.

8 Claims, 4 Drawing Figures

ELECTROSTATIC PRECIPITATOR WITH RAPPERS FOR THE CORONA ELECTRODES

Field of the Invention

Our present invention relates to an electrostatic precipitator or a so-called electrofilter having rappers for the corona electrodes and, more particularly, to improvements in rapper arrangements for corona electrodes in such filters.

Background of the Invention

An electrostatic precipitator or electrofilter for the separation of particulates from a gas stream can comprise a box-shaped housing provided internally with a plurality of separating fields. Each of these fields can be formed between at least one collector electrode and at least one corona-discharge electrode spaced therefrom, the electrodes being connected to opposite sides of a source of high voltage.

In general, the collector electrodes are provided in mutually parallel spaced apart relationships to define between them passages for the gas stream, the corona discharge electrodes being disposed in rows between collector electrodes and within these passages.

It is common practice to provide within the housing a so-called rapper arrangement which is capable of jolting the collector electrodes and/or the corona discharge electrodes to remove collected dust therefrom.

A typical rapper arrangement may comprise respective whipper-type hammers which are slung from respective shafts and which, when the shafts are rotated, impact against anvils on the holders for the collector and/or discharge electrodes.

Electrostatic precipitators of this type can have collecting hoppers for the precipitated dust below the arrays of electrodes and a lateral inlet and outlet for the gas stream.

An electrostatic precipitator with a lateral drive arrangement for the shafts of the rappers is described, for example, in the German uility model DE-GBM No. 19 35 026. Since the rapper arrangements for the corona discharge electrode are at high voltage, insulation must be provided between each rapper and the drive in this arrangement. One of the problems arising with this system is that dust can collect on the insulator or the part adjacent the insulator so that it is common to provide the insulator externally of the filter housing. This requires additional housing structure and makes the overall construction of the electrostatic precipitator more complicated.

With increasing capacities of electric power stations and particularly combustion-fueled electric power stations, there has been an increase in the number of electrostatic precipitators which must be provided for such stations and for each such station. For example, when a power plant having a 700 megawatt capacity is provided, a number of electrostatic units must be provided in parallel, e.g. four such units, in mutually adjacent relationships. Each of the corona discharge systems for the electrostatic precipitators must be provided in a respective box-like housing and each of the electrostatic precipitators must be subdivided into a succession of zones which are electrically separated from one another and which are connected to respective high-voltage supplies.

When, therefore, the rappers for the various separating zones are insulated from one another by the techniques previously described and the insulators must be provided outside the main housing or special housing structures, the assembly of the dust-cleaning installation as a whole is inordinately complicated and the possibility of constructing the assembly so that the electrostatic precipitators are located wall to wall and in close proximity is precluded. In fact, the spatial requirement for the total assembly is far greater, because of the location of the insulator arrangement, than is acceptable.

OBJECTS OF THE INVENTION

It is the principal object of the present invention to provide an improved electrostatic precipitator or electrofilter whereby the disadvantages of the earlier systems referred to above are avoided.

Still another object of the invention is to provide a low cost, compact electrostatic precipitator with a rapper arrangement for the corona discharge electrodes.

Still another object of the invention is to provide an electrostatic precipitator with a low cost, efficient drive for the rapper arrangement.

Still a further object of the invention is to provide a highly compact, low cost, high-efficiency electrostatic precipitator which can be disposed in close proximity to other electrostatic precipitators for gas cleaning in a given plant.

SUMMARY OF THE INVENTION

These objects and others which will become apparent hereinafter are attained, in accordance with the present invention, in an electrostatic precipitator construction in which the components hitherto required for electrical insulation of the rapper segments outside the main housing are eliminated and nevertheless an effective electrical separation of the high-voltage fields is ensured, all in an electrostatic precipitator or electrofilter having a box-like housing, spaced apart parallel collector electrodes defining with respective corona discharge electrodes a plurality of separating fields, and respective rapping hammers engaging anvils connected to the hanger or holder arrangements for the electrodes.

According to the present invention, the rapper or hammer shafts for the corona electrodes of neighboring separator fields are axially aligned or contiguous but are connected together by insulating couplings and are driven by a common drive. The arrangement of the present invention thus ensures that there will be significant high-voltage separation between the high-voltage fields. To this end, in the region of the couplings, the insulating structures must completely preclude any possibility of sparkover or like bridging of the two shaft parts. This can be accomplished, in accordance with the invention, by forming the insulator as a disk, thereby increasing the leakage path which must be bridged by an arc, the insulator disk being connected via flanges between the confronting ends of the rapper shafts.

According to another feature of the invention, the diameter of the insulator disk is greater than the distance between the ends of the two shafts to be joined by the coupling formed by the disk.

In yet another feature of the invention, the insulator disk is formed along its lateral surfaces and along its periphery with grooves to increase the leakage or creep path which must be spanned by a breakdown arc.

The insulator disk is best composed of aluminum oxide ceramic ($Al_2O_3$), i.e. an alumina, and it has been found to be advantageous to provide the disk with hubs formed with entraining surfaces which can be engaged by connecting sleeves axially shiftable on but angularly coupled with the connecting flanges.

According to another feature of the invention, the connecting sleeves and flanges are joined by claw or jaw members while the connecting flanges have at their free end faces, respective centering shoulders which can engage a centering formation of counterflanges fixed to the ends of the rapper shafts.

In yet another feature of the invention, the lengths of the centering formations at the counterflange are smaller than the axial displaceability of the jaw-clutch portion between the connecting sleeve and the connecting flange.

This construction ensures that the insulating junction between two rapper shafts will be capable of withstanding the shock transmitted upon impact and will be able to be assembled or dismounted easily as may be required.

BRIEF DESCRIPTION OF THE DRAWING

The above and other objects, features and advantages of the present invention will become more readily apparent from the following description, reference being made to the accompanying drawing in which.

Specific Description

Figure 1:
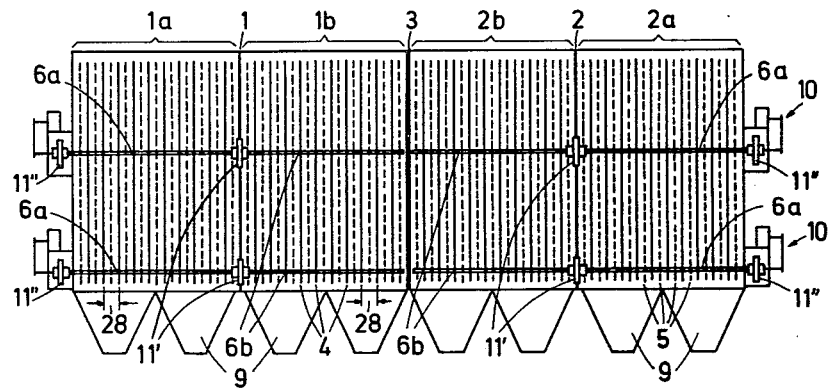
FIG. 1 is a highly simplified schematic vertical section through two separately functioning electrostatic precipitator units disposed in a double housing and forming each a pair of separate but adjacent separator fields which are to be electrically isolated from one another, the section being represented in the region of the rapper device for the corona-discharge electrode frame.

FIG. 1 of the drawing is a schematic simplified view of an electrostatic precipitator assembly, for example of the type used in high capacity electric power plants of the fossil-fuel type. In such systems, two or more electrostatic precipitator units can be provided in side-by-side relationship as shown for the housings 1, 2 in this embodiment.

Each of the housings 1 and 2 is identical to the other and the electrostatic precipitator units received in the housing are subdivided into two parallel separating fields 1a, 1b and 2a, 2b, respectively, each of which is provided with respective gas passages 28 whose width is determined by the spacing between each pair of collector electrodes. The two fields 1a, 1b or 2a, 2b may be spaced apart by the width of the passage 28.

Further substantially identical constructed separate fields may be provided, in a manner not visible from FIG. 1, behind the fields 1a, 1b and 2a, 2b.

Both of the separate fields 1a and 1b or 2a and 2b (together with the respective separate fields lying behind them) form an electrofilter unit enclosed in the housing 1 or 2 which can have a partition 3 between them and thus can have the nearest charged plates separated by a distance corresponding to the width of the passage 28.

In the embodiment shown in FIG. 1, the collector electrodes 4 are spaced apart by about 250 to 300 mm and are grounded and connected to the housing walls or formed at housing walls.

Between juxtaposed collector electrodes 4 there are provided rows of corona discharge electrodes 5 which can be tensioned in respective frames or can be suspended from respective support, being weighted to their bottoms in a manner known per se. The rows of corona discharge electrodes are thus also separated by a distance corresponding to the width of the passages 28 and the collector electrodes are separated by this distance as well.

The collector electrodes 4 and the corona discharge electrodes are at predetermined time intervals freed from accummulated dust, i.e. the dust layers must be dislodged. For this purpose, each of the separating fields 1a, 1b and 2a, 2b within each housing 1 and 2, is provided with a respective mechanical rapper which is represented, for simplicity in FIG. 1, only by the rapper shafts 6a and 6b.

To the extent not othewise described herein, the rapper shafts carry whipping hammers which are pivoted eccentrically on the shaft and strike anvils connected to the hanger frames of the corona discharge electrodes and supports of the collector electrodes.

Figure 2:
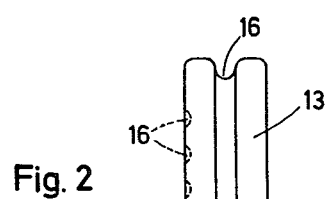
FIG. 2 is a detail view, drawn to an enlarged scale and likewise in section of a connector between two rapper shafts in the region as shown at II in FIG. 1.

The whipper hammers 7, of which each rapper shaft 6a, 6b carries a plurality, are each pivotally connected to the shafts via the crank arms 8 as can be seen from FIG. 2.

The free ends thus are slung by the shaft against the anvil provided on the suspending frames or girders for the electrodes.

The rapping system is actuated only intermittently and at predetermined time intervals by drive units represented at 10 to place the rapper shaft 6a, 6b in rotation, only after the dust layers built up to a predetermined thickness on the collector electrodes 4 and/or the corona discharge electrodes 5 so that large chunks of the dust layer break away and fall rapidly with a minimum of retrainment or turbulence of the dust, into the bunkers or bins 9.

The rappers for the separate fields 1a, 1b and 2a and 2b of the two units are driven by common drive motors and gearing arrangements represented at 10, hereinafter referred to as drives. Drives are mounted on the outer sides of the housings 1 and 2 and each drive 10 is connected via an insulating clutch 11 at one end of the rapper shaft 6a. Thus the insulating arrangement 11 serves to mechanically connect the two shafts of one rapper arrangement while the insulating coupling 11″ serves to mechanically connect these shafts with the respective drive 10. The insulating coupling also maintains electrical separation between the fields 1a, 1b and 2a, 2b which can be at different high voltages of 30 to 60 kilovolts.

The insulating couplings are designed so that voltage-leakage or creep paths between the two shafts or between the shaft 6a and the drive 10 are sufficiently great that leakage simply does not occur.

While this can be achieved by providing the coupling as a very long insulating rod, this is not practical for electrostatic precipitators wherein the space available to receive the coupling is limited to the width of the passage 28 between two adjacent separating fields 1a and 1b or 2a and 2b.

Figure 3:
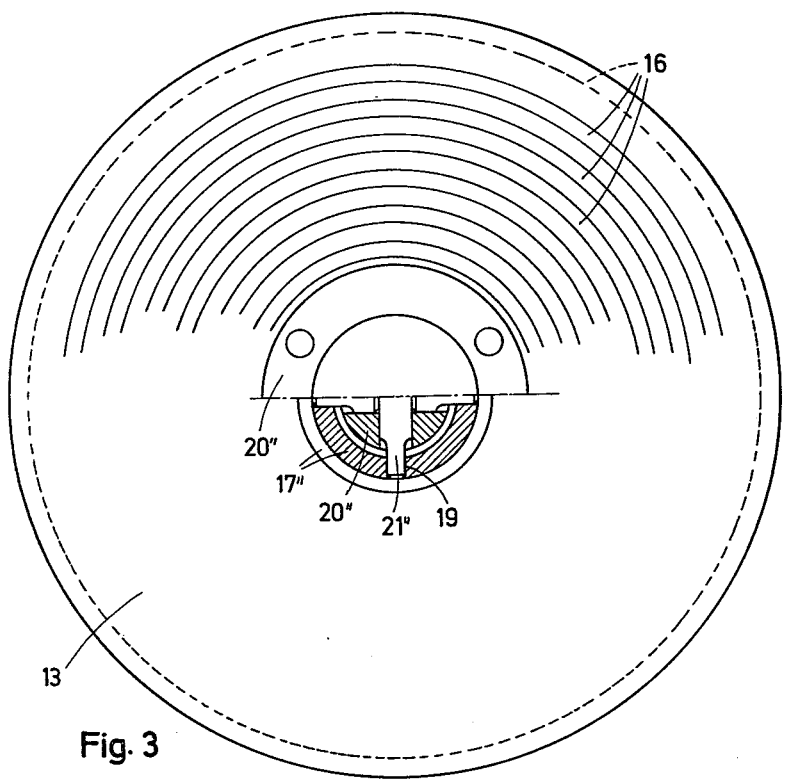
FIG. 3 is a section along the line III—III of FIG. 2.
Figure 4:
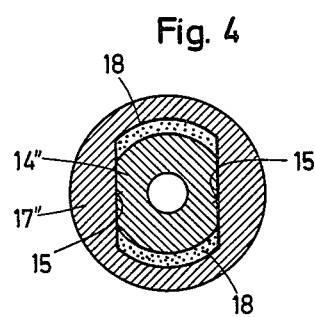
FIG. 4 is a section taken along the line IV—IV in FIG. 2.

Thus the invention provides, for a sufficiently long creep-current path, that the insulating couplings 11′ and 11'' are formed as disk insulators 12 as has been illustrated in FIGS. 2 through 4.

The insulating disk 12 is formed of an aluminum oxide ceramic ($Al_2O_3$) with a Vickers hardness between 23000 and 25500 $N/mm^2$ and a bending strength between 300 and 500 $N/mm^2$ so that the insulator will be able to withstand the operating stresses applied in use of the rapper.

The insulated disks 12 are formed unitarily on both sides of the disk body 13, with hubs 14' and 14'' provided with noncircular surfaces 15 referred to hereinafter as entrainment surfaces. These surfaces, which allow rotary engagement or angular entrainment, can be flats formed diametrically opposite one another as shown in FIG. 4.

The body 13 of the disk, provided on both of its lateral (axial) faces as well as along its periphery with grooves, corrugations or ribs 16 which increase the effective length of the creep path. The diameter of the disk body 13 is greater than the distance between two collector plates, is greater than the width of the channels 28 and is greater than the distance between two juxtaposed side walls of the two filter housings 1 and 2. It is also greater than the axial distance between the juxtaposed ends of the shafts 6a and 6b or the distance between the juxtaposed ends of the shaft 6a and the drive 10 so that the length of the current-creep or current-sneak path along or around the insulators is sufficient to preclude any flashover or surface discharge across the insulator.

To connect the insulated disk 12 angularly with the rapper shafts 6a and 6b, the hubs 14' and 14'' which are integral with the disk body 13, are each engaged in connecting sleeves 17' and 17'' having noncircular sockets which are formed by flats engaging the flats 15. Adhesive or potting material 18 fills the remaining space between the hubs 14', 14'' and the sockets of the sleeves 17', 17'' so that the sleeves are connected to the hubs against relative axial motion.

The other ends of the connecting sleeves 17', 17'' are formed with claws 19 which engage radial pins 21', 21'' reaching between pairs of claws and carried by connecting flanges 20' and 20''. The cooperation between the claws 19 and the respective pins 21' and 21'' permits relative axial movement of the sleeve 17', 17'' and the respective connecting flanges 20' and 20'' while nevertheless angularly coupling them. At their free faces, the connecting flanges 20' and 20'' are formed with centering shoulders 22' and 22'', respectively, which engage centering bosses 23', 23'' at the free faces of a counterflange 24' or 24'', the two flanges 20' and 24' and 20'', 24'' being connected by screws 27' and 27'' respectively. The counterflanges 24' and 24'' are mounted on the shafts 6', 6'' respectively.

The depth of the recess formed by the centering shoulders 22' or 22'' and the axial length of the centering bodies 23' and 23'', i.e. the depth of penetration 25' or 25'' between the two flanges 20' and 20'' and the counterflanges 24' or 24'' is less than the axial plan 26' or 26'' between the engaged claw-clutch parts 19, 21' or 19, 21'' respectively. This permits the insulating couplings 11' and 11'' to be withdrawn and replaced without modifying the axial positions of the shafts 6a and 6b.

The insulating couplings of the present invention can be used wherever the rotational connection of two shafts is required in an electrostatic precipitator, e.g. to connect the shafts of two different housings as well as the shafts within a housing and a shaft of a housing to a drive mounted thereon. Thus in the case of the embodiment shown in FIG. 1, a similar coupling can be provided to connect the shafts of the two housings together, thereby eliminating the need for one of the drives.

We claim:

1. In an electrostatic precipitator assembly comprising at least one housing, a plurality of spaced apart collector electrodes in said housing defining gas passages between them and connected to one side of a high voltage source, corona discharge electrodes disposed in said gas passages in said housing and connected to another side of said high voltage source, the collector and discharge electrodes forming a plurality of separate fields which require electrical insulation from one another, and rotary rappers in said housing respectively positioned for rapping electrodes of said fields, the improvement which comprises:

a respective shaft for each of said rappers, said shafts having ends turned toward one another and spaced apart from one another;

an electrically insulating coupling interconnecting said ends of said shafts for joint rotation while electrically insulating them from one another; and a common drive connected to one of said shafts remote from the said end thereof for rotating both said shafts, said coupling comprising a disk-shaped electrical insulator body lying in a plane perpendicular to the axis of said shafts, and respective connecting flanges at said ends of said shafts individually connected to said body, said body having a circular configuration with a diameter greater than the distance between the ends of the shafts and greater than the diameters of said connecting flanges.

2. The improvement defined in claim 1 wherein said body has a grooved periphery and grooved opposite axial faces for increasing the electrical-breakdown creep path.

3. The improvement defined in claim 1 wherein said body is composed of an aluminum oxide ceramic.

4. The improvement defined in claim 1 wherein said body is formed with a pair of hubs having noncircular configurations, each of said hubs being connected to a respective one of said flanges by a connecting sleeve fitting over said hubs and form-fittingly engaging same.

5. The improvement defined in claim 4 wherein each of said sleeves is connected to the respective flange by an element enabling relative axial movement of the sleeve and the flange but angularly coupling same for joint rotation.

6. The improvement defined in claim 5 wherein each of said elements includes a claw member connected to the respective sleeve, and a connecting flange engaging the respective claw member for joint angular displacement but enabling relative axial movement, each connecting flange and the aforementioned flange of said shaft being provided with a centering shoulder and boss arrangement.

7. The improvement defined in claim 6 wherein the depth of penetration of each boss into the recess formed by the respective shoulder is less than the axial play of the respective connecting flange and claw member.

8. The improvement defined in claim 7, further comprising at least one bolt connecting each flange of a respective shaft with the respective connecting flange.

* * * * *